(12) United States Patent
Low et al.

(10) Patent No.: US 9,496,755 B2
(45) Date of Patent: Nov. 15, 2016

(54) SYSTEMS, METHODS, AND APPARATUS FOR RECTIFIER FILTERING FOR INPUT WAVEFORM SHAPING

(75) Inventors: Zhen Ning Low, San Diego, CA (US); Sreenivas Kasturi, San Diego, CA (US); Xuanning Gao, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 325 days.

(21) Appl. No.: 13/435,343

(22) Filed: Mar. 30, 2012

(65) Prior Publication Data

US 2013/0077361 A1   Mar. 28, 2013

Related U.S. Application Data

(60) Provisional application No. 61/539,381, filed on Sep. 26, 2011, provisional application No. 61/551,851, filed on Oct. 26, 2011.

(51) Int. Cl.
*H02M 1/14* (2006.01)
*H02J 17/00* (2006.01)
*H02M 1/12* (2006.01)

(52) U.S. Cl.
CPC ............... *H02J 17/00* (2013.01); *H02M 1/14* (2013.01); *H02M 1/126* (2013.01); *H02M 1/143* (2013.01)

(58) Field of Classification Search
CPC .............. H02M 1/12; H02M 1/4266; H02M 2001/123; H02M 1/14; H02M 1/4208; H02M 1/143; H02M 1/15; H02M 1/126; H02J 3/01

USPC ................................. 363/39, 44–48
See application file for complete search history.

(56) References Cited

U.S. PATENT DOCUMENTS

| | | | | |
|---|---|---|---|---|
| 4,233,565 A | * | 11/1980 | Chmura ............. | H04L 27/2275 329/310 |
| 4,344,318 A | * | 8/1982 | Dudeck et al. ............. | 73/35.03 |
| 4,395,588 A | * | 7/1983 | Franssen et al. ............. | 381/96 |
| 4,430,620 A | * | 2/1984 | Fisher et al. ............. | 329/356 |
| 5,671,133 A | * | 9/1997 | Fujita et al. ............. | 363/126 |
| 5,923,544 A | | 7/1999 | Urano | |

(Continued)

FOREIGN PATENT DOCUMENTS

| | | |
|---|---|---|
| JP | 11069667 A | 3/1999 |
| JP | 2006211855 A * | 8/2006 |

(Continued)

OTHER PUBLICATIONS

International Search Report and Written Opinion—PCT/US2012/057122—ISA/EPO—Feb. 19, 2013.

*Primary Examiner* — Jeffrey Gblende
(74) *Attorney, Agent, or Firm* — Knobbe, Martens, Olson & Bear LLP

(57) ABSTRACT

This disclosure provides systems, methods, and apparatus for filtering of a rectifier in a wireless power receiver. In one aspect a wireless power receiver is provided. The wireless power receiver includes a rectifier circuit configured to provide direct-current (DC) based at least in part on a time-varying voltage generated via a wireless field provided from a wireless power transmitter. The wireless power receiver further includes a band-stop filter circuit configured to filter an output of the rectifier circuit and electrically isolate a capacitor from the rectifier circuit at an operating frequency.

35 Claims, 10 Drawing Sheets

(56) References Cited

U.S. PATENT DOCUMENTS

| | | | |
|---|---|---|---|
| 6,430,064 B1 | 8/2002 | Tsuchimoto et al. | |
| 6,606,260 B2* | 8/2003 | Ahlstrom | 363/125 |
| 7,176,589 B2 | 2/2007 | Rouquette | |
| 2002/0126018 A1 | 9/2002 | Warren | |
| 2003/0111982 A1 | 6/2003 | Watanabe | |
| 2004/0213026 A1* | 10/2004 | Park et al. | 363/132 |
| 2005/0162125 A1 | 7/2005 | Yu et al. | |
| 2007/0220050 A1* | 9/2007 | Hsu et al. | 707/104.1 |
| 2007/0273487 A1* | 11/2007 | Dawson | 340/286.07 |
| 2009/0157145 A1* | 6/2009 | Cauller | 607/60 |
| 2009/0243754 A1* | 10/2009 | Conta et al. | 333/167 |
| 2010/0141051 A1 | 6/2010 | Vollaire | |
| 2011/0075449 A1 | 3/2011 | Fouquet | |
| 2011/0130093 A1 | 6/2011 | Walley et al. | |
| 2011/0156643 A1 | 6/2011 | Chen et al. | |
| 2013/0021113 A1* | 1/2013 | Bakalski | H04B 1/18 |
| | | | 333/176 |
| 2013/0077360 A1 | 3/2013 | Low et al. | |
| 2015/0064970 A1 | 3/2015 | Low et al. | |

FOREIGN PATENT DOCUMENTS

| | | |
|---|---|---|
| JP | 2011101524 A | 5/2011 |
| WO | WO-2004057247 A1 | 7/2004 |
| WO | 2008156489 A1 | 12/2008 |
| WO | 2010050958 A1 | 5/2010 |
| WO | 2011052653 A1 | 5/2011 |

\* cited by examiner

US 9,496,755 B2

SYSTEMS, METHODS, AND APPARATUS FOR RECTIFIER FILTERING FOR INPUT WAVEFORM SHAPING

CROSS REFERENCE TO RELATED APPLICATIONS

This application claims benefit under 35 U.S.C. §119(e) to U.S. Provisional Patent Application No. 61/539,381 entitled "RECTIFIER FILTERING FOR INPUT WAVEFORM SHAPING" filed on Sep. 26, 2011, the disclosure of which is hereby incorporated by reference in its entirety. This application further claims benefit under 35 U.S.C. §119(e) to U.S. Provisional Patent Application No. 61/551,851 entitled "RECTIFIER FILTERING FOR INPUT WAVEFORM SHAPING" filed on Oct. 26, 2011, the disclosure of which is also hereby incorporated by reference in its entirety.

FIELD

The present invention relates generally to wireless power. More specifically, the disclosure is directed to filtering of a rectifier in a wireless power receiver.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power receiver. The wireless power receiver includes a rectifier circuit configured to provide direct-current (DC) based at least in part on a time-varying voltage generated via a wireless field provided from a wireless power transmitter. The wireless power receiver further includes a band-stop filter circuit configured to filter an output of the rectifier circuit and electrically isolate a capacitor from the rectifier circuit at an operating frequency.

Another aspect of the disclosure provides an implementation of a method for filtering at a wireless power receiver. The method includes rectifying at least part of a time-varying voltage to a direct-current (DC) via a rectifier circuit. The time-varying voltage is generated via a wireless field provided from a wireless power transmitter. The method further includes filtering an output of the rectifier circuit via a band-stop filter circuit to electrically isolate a capacitor from the rectifier circuit at an operating frequency.

Yet another aspect of the disclosure provides a wireless power receiver. The wireless power receiver includes means for rectifying at least part of a time-varying voltage to a direct-current (DC). The time-varying voltage is generated via a wireless field provided from a wireless power transmitter. The wireless power receiver further includes means for filtering an output of the means for rectifying via a band-stop filter circuit to electrically isolate a capacitor from the means for rectifying at an operating frequency.

Figure 1:
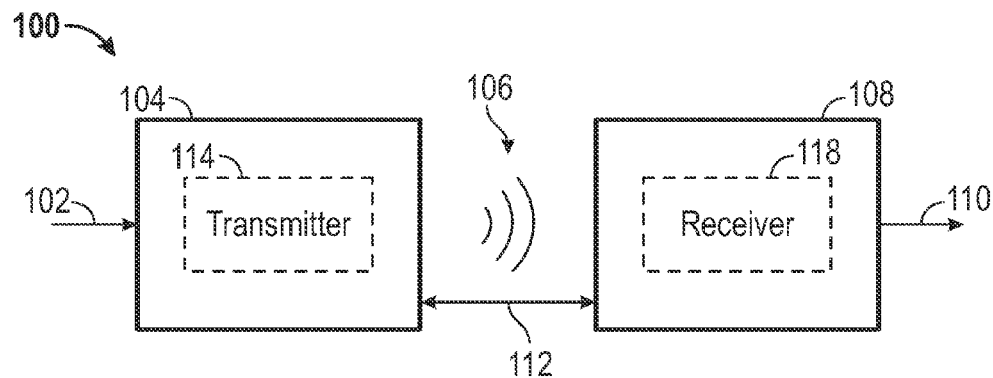
FIG. 1 is a functional block diagram of an exemplary wireless power transfer system, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with an exemplary embodiment of the invention. Input power 102 may be provided to a transmitter 104 from a power source (not shown) for generating a field 106 for providing energy transfer. A receiver 108 may couple to the field 106 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 106 produced by the transmitter 104. The field 106 corresponds to a region where energy output by the transmitter 104 may be captured by a receiver 106. In some cases, the field 106 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 106 of the transmit coil 114 to a receive coil 118 rather than propagating most of the energy in an electromagnetic wave to the far field. When positioned within the field 106, a "coupling mode" may be developed between the transmit coil 114 and the receive coil 118. The area around the transmit and receive coils 114 and 118 where this coupling may occur is referred to herein as a coupling-mode region.

Figure 2:
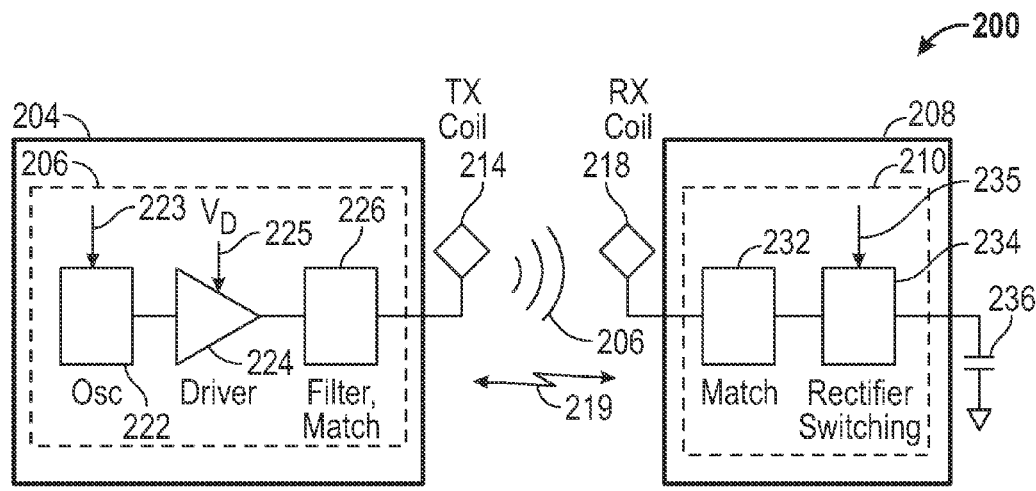
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
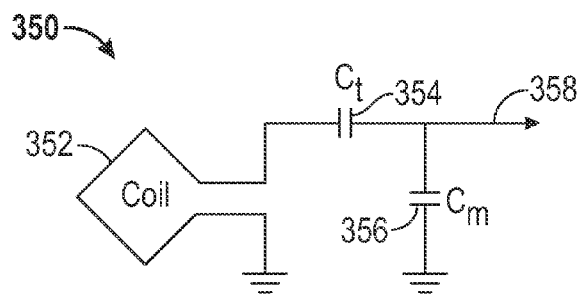
FIG. 3 is a schematic diagram of a portion of transmit circuitry or receive circuitry of FIG. 2 including a transmit or receive coil, in accordance with an exemplary embodiment of the invention.

FIG. 3 is a schematic diagram of a portion of transmit circuitry 206 or receive circuitry 210 of FIG. 2 including a transmit or receive coil 352, in accordance with an exemplary embodiment of the invention. As illustrated in FIG. 3, transmit or receive circuitry 350 used in exemplary embodiments may include a coil 352. The coil 352 may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil 352 may also be referred to as an "antenna" of a type that is configured to wirelessly output or receive power. The coil 352 may also be referred to as a power transfer component of a type that is configured to wirelessly provide or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 106 of the transmitting coil to the receiving coil residing in the neighborhood where this field 106 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 106, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
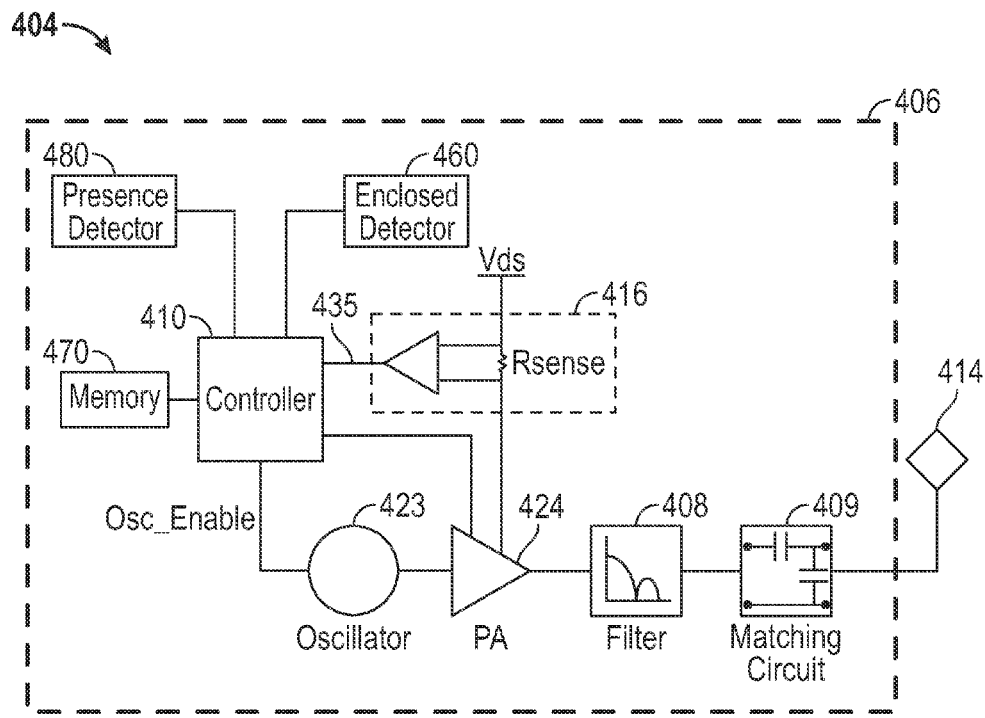
FIG. 4 is a functional block diagram of a transmitter that may be used in the wireless power transfer system of FIG. 1, in accordance with an exemplary embodiment of the invention.

FIG. 4 is a functional block diagram of a transmitter 404 that may be used in the wireless power transfer system of FIG. 1, in accordance with an exemplary embodiment of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 410 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 410 may also be referred to herein as processor 410. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 410 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 410 (also referred to as a processor herein). The controller 410 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 410 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
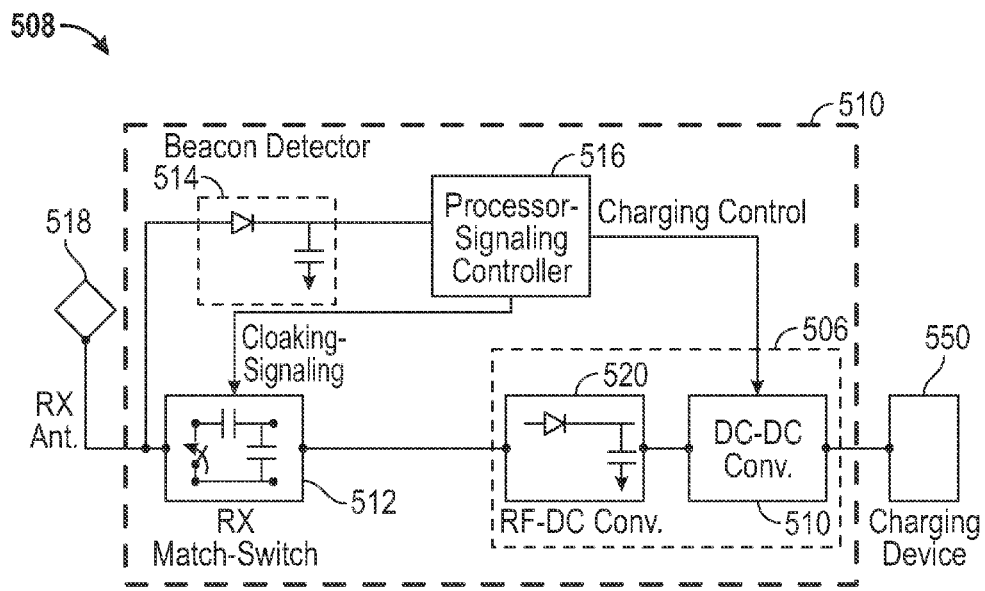
FIG. 5 is a functional block diagram of a receiver that may be used in the wireless power transfer system of FIG. 1, in accordance with an exemplary embodiment of the invention.

FIG. 5 is a functional block diagram of a receiver 508 that may be used in the wireless power transfer system of FIG. 1, in accordance with an exemplary embodiment of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 510. RF-to-DC converter 508 rectifies the RF energy signal received at receive coil 518 into a non-alternating power with an output voltage represented by $V_{rect}$. The DC-to-DC converter 510 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field. Switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Processor 516 may also monitor beacon circuitry 514 to determine a beacon state and extract messages sent from the transmitter 404. Processor 516 may also adjust the DC-to-DC converter 510 for improved performance.

Figure 6:
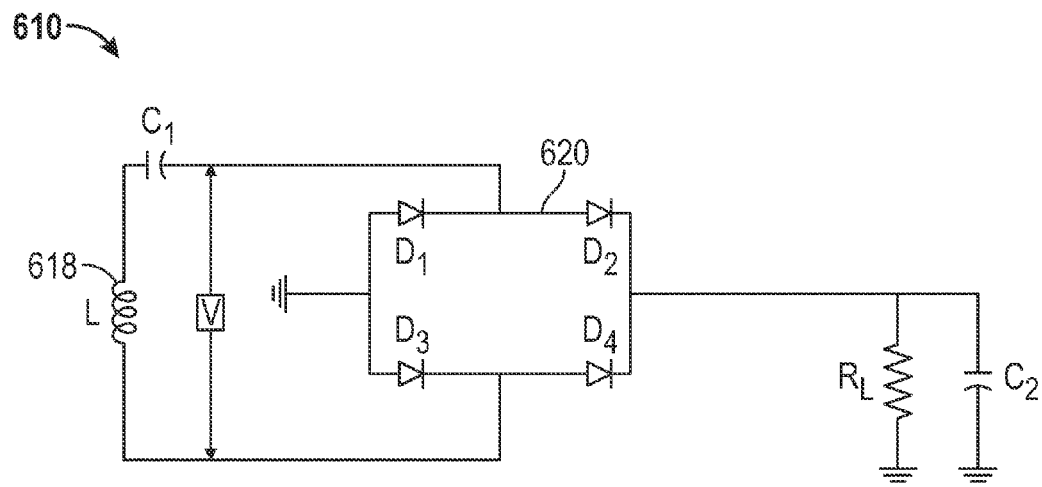
FIG. 6 is a schematic diagram of an exemplary portion of receive circuitry that may be used in a wireless power receiver such as the receiver of FIG. 5, in accordance with an exemplary embodiment of the invention.

FIG. 6 is a schematic diagram of an exemplary portion of receive circuitry 610 that may be used in a wireless power receiver such as the receiver 508 of FIG. 5, in accordance with an exemplary embodiment of the invention. Receive circuitry 610 includes a receive coil 618 and a capacitor $C_1$ that may form a resonant circuit. A time-varying voltage V may be induced/generated in the receive coil 618 when the receive coil 618 wirelessly receives power via a wireless field 106 provided by a transmitter 104 (FIG. 1) (e.g., the receiver coil 618 may couple with a transmitter 104 via a field 106). As similarly described above, a rectifier circuit 620 may be electrically connected to the receive coil 618 and may be configured to rectify the time-varying voltage V (i.e., alternating current (AC)) generated via the wireless field to provide direct-current (DC) based at least in part on the time-varying voltage. In some embodiments, the rectifier circuit 620 may be a full wave rectifier. In one embodiment, the rectifier circuit 620 may be a full bridge rectifier circuit and may include diodes $D_1$, $D_2$, $D_3$, and $D_4$. The receive circuitry 610 may further include a smoothing circuit that may include a charge holding capacitor $C_2$, that may be used to provide a more constant voltage DC to power or charge a load $R_L$ based on the rectified output.

Figure 7:
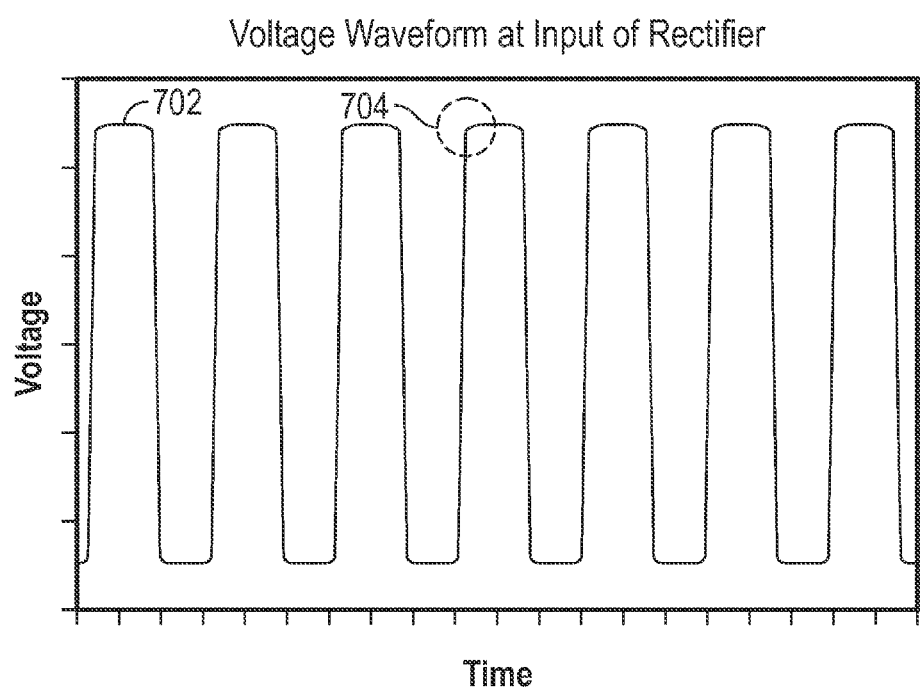
FIG. 7 is a plot of an exemplary hypothetical voltage waveform at the input of a rectifier circuit as shown in FIG. 6.

FIG. 7 is a plot of an exemplary hypothetical voltage waveform 702 at the input of a rectifier circuit 620 as shown in FIG. 6. Ideally, the time-varying voltage V induced at the receive coil 618 would be represented by a substantially perfect sine wave waveform at the input of the rectifier circuit 620. However, due to, for example, the non linear operation of the rectifier circuit 620, the voltage waveform 702 at the input of the rectifier circuit 620 may include significant harmonic content and other undesirable content. The harmonic content is indicated in the waveform 702 by the sharp edges shown, for example, within circle 704. In one aspect, the undesirable harmonic content indicated by the sharp edges shown by 704 may be explained as the input AC waveform 702 is instantaneously shorted by charge holding capacitor $C_2$ (i.e., smoothing capacitor) when the diodes $D_1$, $D_2$, $D_3$, $D_4$ of the receive circuit 620 conduct. The undesirable harmonic content may result in wireless emissions that may radiate from the receive coil 618 and may make it more difficult to satisfy regulatory emission mask requirements and may increase the possibility of interference with other wireless signals. This problem may not be as applicable in other power delivery systems that may not be concerned with wireless interference and jamming and may not have the same type of emission mask requirements as presented in a wireless system. For example, power delivery systems that provide power via cables or other similar connections may not be concerned with wireless output. In contrast, significant wireless emissions from a receive coil 618 in a wireless power transfer system transferring power at high levels could result in substantial interference. Methods and systems that can effectively and inexpensively prevent unwanted wireless emissions while receiving wireless power at sufficient levels for powering or charging a battery/device are desirable.

Filtering could be done on the AC side of the rectifier circuit 620 to prevent emissions of the receive coil 618. However, an AC filter circuit may result in an undesirable impedance transformation. In a wireless power transfers system, an undesirable impedance transformation may have a significant effect on and/or reduce the efficiency of power transfer. For example, an undesirable impedance transformation could result in a detuning effect that would prevent the receive coil 618, from resonating, and reduce the efficiency and/or amount of power transfer. In addition, an AC filter circuit may result in higher power losses, may increase thermal losses, may decrease efficiency, and may have other undesirable effects. As such, one aspect of one exemplary embodiment is directed to reducing noise and other harmonic content at the input of the rectifier circuit 620 to reduce the radiative emissions and other undesirable effects caused, for example, by non-linear operation of the rectifier circuit 620, without creating higher losses or impedance transformations.

In one exemplary embodiment, filtering may be done on the DC side of the rectifier circuit 620. In one aspect, components used on the DC of the rectifier circuit 620 may be more efficient than filter components used on the AC side of the rectifier circuit 620 in addition to other advantages. To effectively prevent harmonics at the input of the AC waveform, one aspect of an exemplary embodiment is directed to isolating the charge holding capacitor $C_2$ and creating high impedance between the charge holding capacitor $C_2$ and the rectifier circuit 620 at the operating frequency.

Figure 8:
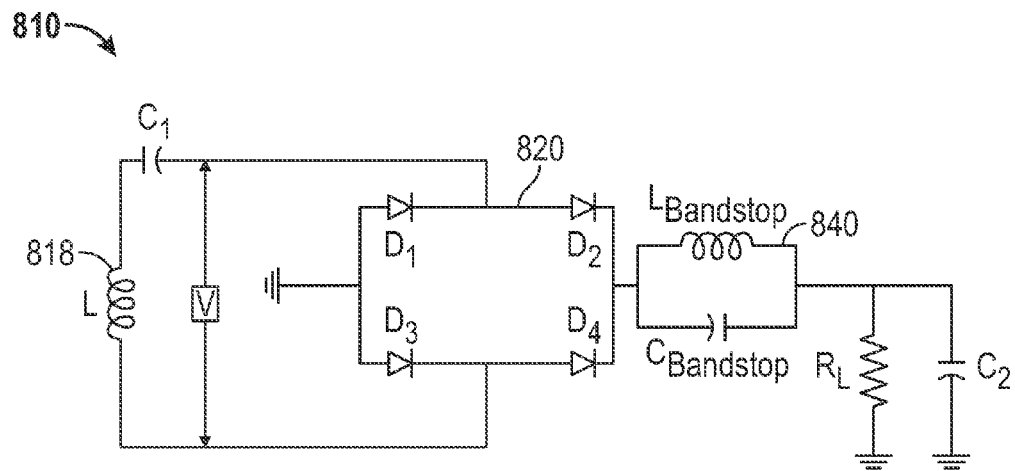
FIG. 8 is a schematic diagram of an exemplary portion of receive circuitry including a band-stop filter circuit on the DC side of the rectifier circuit, in accordance with an exemplary embodiment of the invention.

FIG. 8 is a schematic diagram of an exemplary portion of receive circuitry 810 including a band-stop filter circuit 840 on the DC side of the rectifier circuit 820, in accordance with an exemplary embodiment of the invention. The receive circuitry 810 may be used in a wireless power receiver such as the receiver 508 of FIG. 5. As similarly shown in FIG. 6, the receive circuitry 810 of FIG. 8 includes a receive coil 818 and a capacitor $C_1$. The receive circuitry 810 further includes a rectifier circuit 820 with diodes $D_1$, $D_2$, $D_3$, $D_4$ to rectify the time varying voltage V. The receive circuitry 810 further includes a filter circuit 840 electrically connected to the "high" side of the output of the rectifier circuit 820. The filter circuit 840 may be configured as a band-stop filter circuit 840 having components (e.g., inductors and capacitors) having an inductance $L_{Bandstop}$ and a capacitance $C_{Bandstop}$. In some embodiments, the filter may include an inductor having an inductance $L_{Bandstop}$ and a capacitor having a capacitance $C_{Bandstop}$ that are electrically connected in parallel. In some embodiments the band-stop filter circuit 840 may include one inductor and one capacitor. In some embodiments the filter circuit 840 may be configured as a low pass filter or as a notch filter. To generate a high resistance (for high impedance) using a low pass filter, a higher order filter requiring multiple components may be needed that may be expensive and/or inefficient. As such, a band-stop filter that may include a small number of components (e.g., an inductor and capacitor) may be desirable and/or preferred. For example, a band-stop filter circuit 840 may require less components than a low pass filter circuit. Moreover, the components of a band-stop filter circuit 840 may be able to be chosen to be more efficient as compared to similar components that might be required in a low pass filter circuit. As such, in some exemplary embodiments, using a band-stop filter circuit 840 may provide a variety of unique advantages over other filter types, such as a low pass filter.

The filter circuit 840 may be configured to filter an output of the rectifier circuit 820 and electrically isolate a capacitor $C_2$ from the rectifier circuit 820 at an operating frequency (i.e., the fundamental frequency used for wireless power transmission). For example, the filter circuit 840 may be configured so as to create as high as possible rejection of undesired frequencies. In one embodiment, the operating frequency may be substantially 6.78 MHz. The filter circuit 840 may be configured to increase the impedance between the rectifier circuit 820 and the charge holding capacitor $C_2$. In one aspect, as the filter circuit 840 isolates the capacitor $C_2$ from the rectifier circuit 820, emissions are reduced at the receive coil 818.

Figure 9:
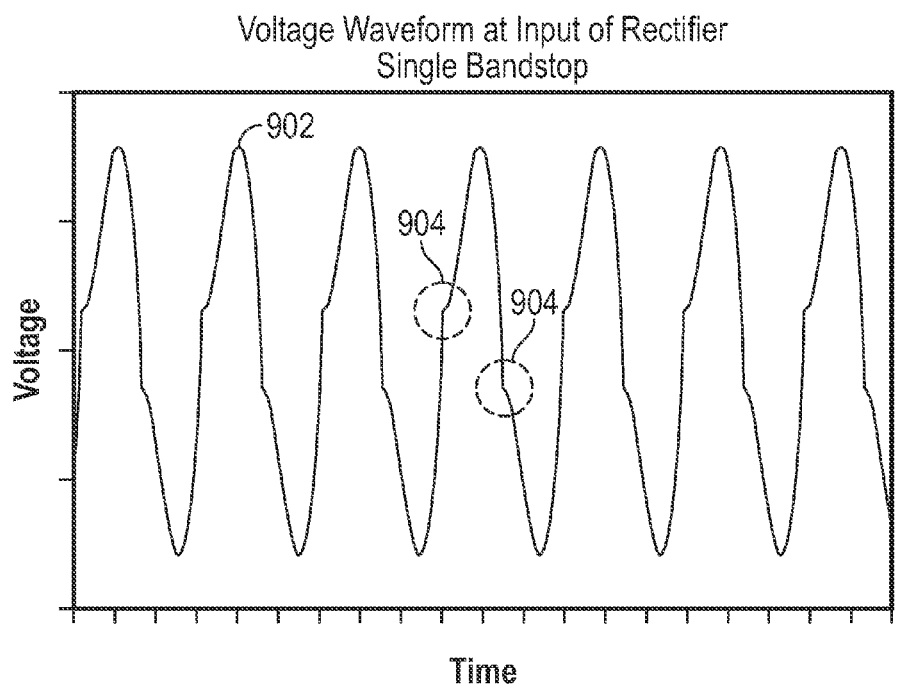
FIG. 9 is a plot of an exemplary hypothetical voltage waveform at the input of a rectifier circuit as shown in FIG. 8.

FIG. 9 is a plot of an exemplary hypothetical voltage waveform 902 at the input of a rectifier circuit 820 as shown in FIG. 8. Due to the operation of filter circuit 840, the voltage waveform 902 approaches a shape that is more similar to a desired sine curve without harmonic content. FIG. 9 shows how the filtered output at the input of the rectifier circuit 820 includes less harmonic content that could otherwise create additional unwanted emissions radiating from the receive coil 812 as compared to the waveform 702 of FIG. 7. While some moderate sharp edges 904 (i.e., some harmonic content) may continue to be present, the waveform 904 shows significantly less harmonic content due to the receive circuitry 810 of FIG. 8. FIG. 9 shows an example of a hypothetical waveform 902 that was generated for purposes of illustration. Using a band-stop filter circuit 840 allows for significant harmonic reduction (and therefore prevention of unwanted wireless emissions) while using simple and efficient components without any undesirable impedance transformation or other effects that may result from filtering on the AC side of the rectifier circuit 820.

Figure 10:
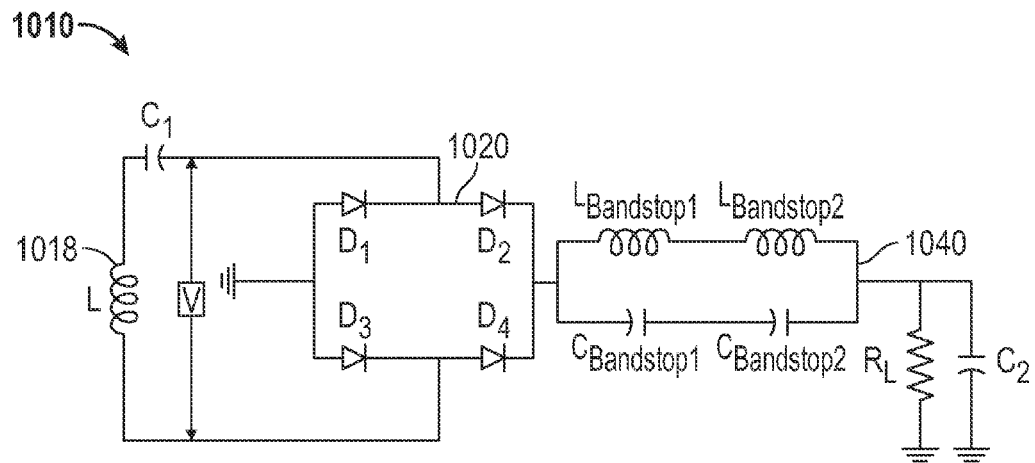
FIG. 10 is another schematic diagram of an exemplary portion of receive circuitry including a band-stop filter circuit with increased (e.g., double) inductance on the DC side of the rectifier circuit, in accordance with an exemplary embodiment of the invention.

FIG. 10 is another schematic diagram of an exemplary portion of receive circuitry 1010 including a band-stop filter circuit 1040 with increased (e.g., double) inductance on the DC side of the rectifier circuit 1020, in accordance with an exemplary embodiment of the invention. The receive circuitry 1010 may be used in a wireless power receiver such as the receiver 508 of FIG. 5. As also shown in FIG. 8, the receive circuitry 1010 of FIG. 10 includes a receive coil 1018 and a capacitor $C_1$ that may be electrically connected to the rectifier circuit 1020 and a charge holding capacitor $C_2$ whose operation is described above. The receive circuitry 1010 further includes a filter circuit 1040 which may be configured as a band-stop filter with a double inductance value. For example, the band-stop filter circuit 1040 may have inductors having inductances $L_{Bandstop1}$ and $L_{Bandstop2}$ along with capacitors $C_{Bandstop1}$ and $C_{Bandstop2}$. This configuration may improve the filtering and isolation to reduce the undesirable emissions, but may require additional components. As such a tradeoff may exist between the cost, complexity, operation of the filter circuit used, and the emission reduction (e.g., harmonic reduction) produced. Component values may therefore be chosen according to particular design constraints of cost, power transfer amounts and efficiencies, and the like.

Figure 11:
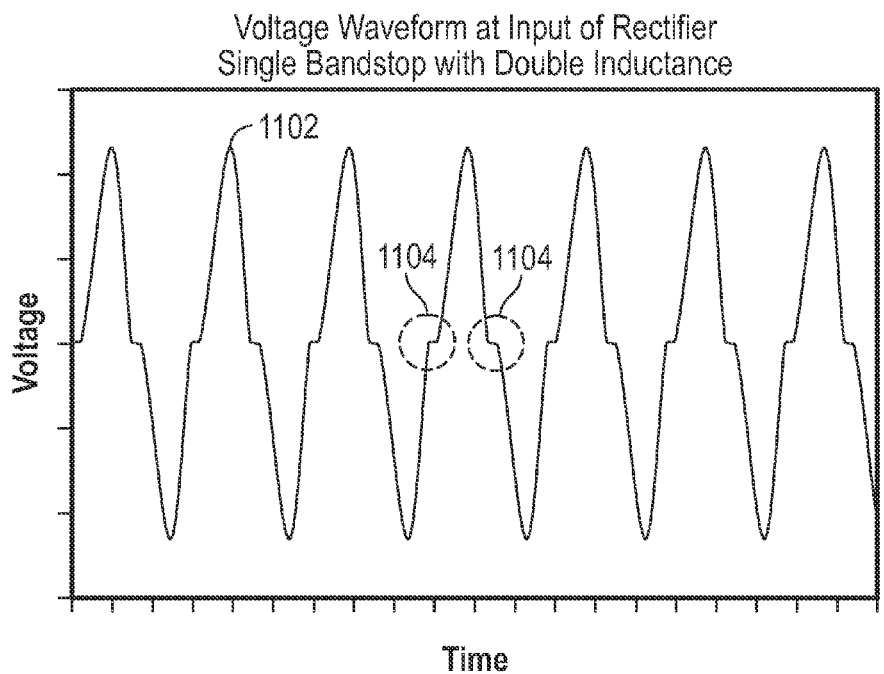
FIG. 11 is a plot of an exemplary hypothetical voltage waveform at the input of the rectifier circuit as shown in FIG. 10.

FIG. 11 is a plot of an exemplary hypothetical voltage waveform 1102 at the input of the rectifier circuit 1020 as shown in FIG. 10. As compared to the waveform 902 of FIG. 9, the waveform 1102 is more symmetrical with some moderate sharp edges 1104 at zero crossings. As such, while requiring additional components, the filter circuit 1040 may improve the isolation and filtering to reduce emissions at the input of the rectifier circuit 1020.

Figure 12:
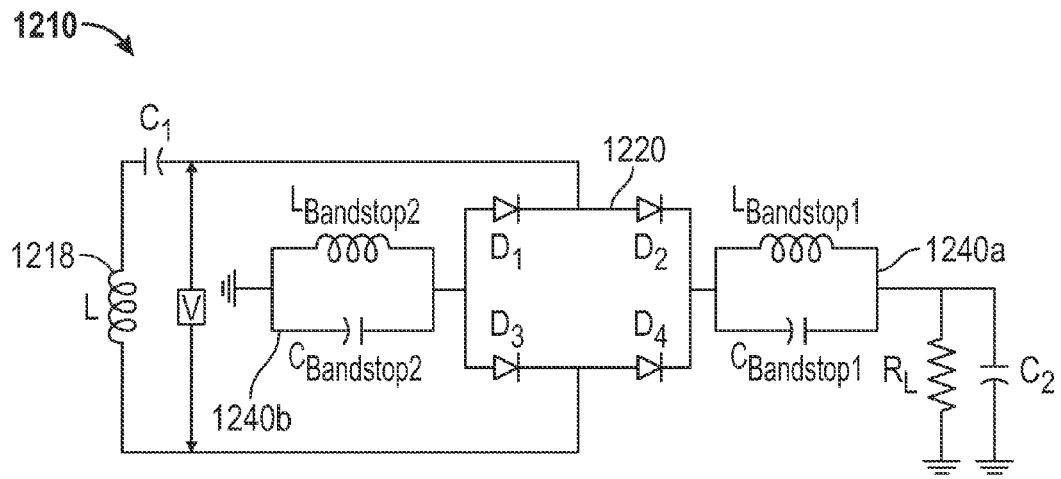
FIG. 12 is another schematic diagram of an exemplary portion of receive circuitry including a balanced dual bandstop filter configuration on the DC side of the rectifier circuit, in accordance with an exemplary embodiment of the invention.

FIG. 12 is another schematic diagram of an exemplary portion of receive circuitry 1210 including a balanced dual band-stop filter configuration 1240a and 1240b on the DC side of the rectifier circuit 1220, in accordance with an exemplary embodiment of the invention. The receive circuitry 1210 may be used in a wireless power receiver such as the receiver 508 of FIG. 5. The receive circuitry 1210 includes a receive coil 1218 having an inductance L and capacitor $C_1$ configured to wirelessly receive power via generation of a time-varying voltage V via a wireless field (e.g., magnetic field) from a transmitter 404 (FIG. 4) as described above. The time-varying voltage generated is provided to a rectifier circuit 1220 to power a load $R_L$. In contrast to FIGS. 8 and 10, the receive circuitry 1210 includes two filter circuits 1240*a* and 1240*b* on either side (the "high" side and the "low" side) of the rectifier circuit 1220. The two filter circuits 1240*a* and 1240*b* may be configured as band-stop filters. In some embodiments, the two band-stop filter circuits 1240*a* and 1240*b* may each have an inductor $L_{Bandstop1}$ and $L_{Bandstop2}$ and capacitors $C_{Bandstop1}$ and $C_{Bandstop2}$ respectfully. In some embodiments, the filter circuits 1240*a* and 1240*b* could be low pass filters. The first filter circuit 1240*a* may be configured to isolate the rectifier circuit 1220 (and therefore input of the rectifier circuit 1220) from the charge holding capacitor $C_2$. The second filter circuit 1240*b* may be configured to isolate a ground (e.g., that may be the chassis of a device) from the rectifier circuit 1220. In some cases a higher Q (quality factor) network that may be used for the receive coil 1218 and other circuitry that may be sensitive to component values. A balanced configuration as shown in FIG. 12 may be desirable for reducing the sensitivity. The two band-stop filter circuits 1240*a* and 1240*b* may each be configured to reject undesired frequencies. In some exemplary embodiments, the operating frequency may be 6.78 MHz.

Figure 13:
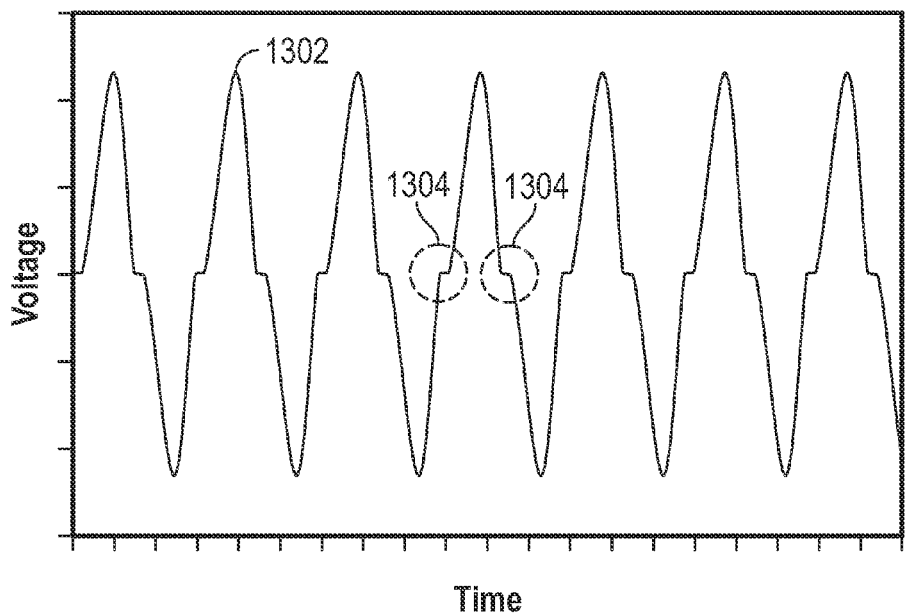
FIG. 13 is a plot of an exemplary hypothetical voltage waveform at the input of a rectifier circuit as shown in FIG. 12.

FIG. 13 is a plot of an exemplary hypothetical voltage waveform 1302 at the input of a rectifier circuit 1220 as shown in FIG. 12. As shown in FIG. 13, the waveform 1302 is more symmetrical as compared to FIGS. 9 and 11 with moderate edges 1304 at zero crossings. This waveform 1302 may result in significantly reduced emissions.

Figure 14:
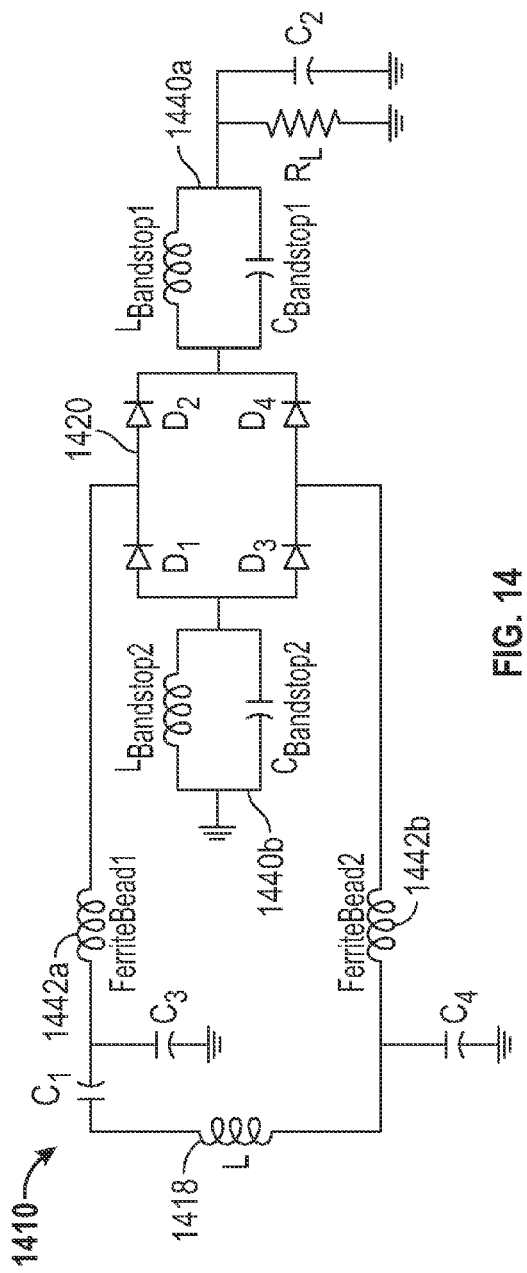
FIG. 14 is another schematic diagram of an exemplary portion of receive circuitry as shown in FIG. 12 further including a ferrite bead and capacitor circuit configuration, in accordance with an exemplary embodiment of the invention.

To further reduce total emissions in different frequency bands, receive circuitry may use additional components. FIG. 14 is another schematic diagram of an exemplary portion of receive circuitry 1410 as shown in FIG. 12 further including a ferrite bead and capacitor circuit configuration for preventing emissions for high frequency content, in accordance with an exemplary embodiment of the invention. As shown in FIG. 14, in addition to the components shown in FIG. 12, the receive circuitry 1410 may include ferrite beads 1442*a* and 1442*b* and capacitors $C_3$ and $C_4$ on the AC side of the rectifier circuit 1420 to prevent emissions due to high frequencies. For example, the ferrite bead/capacitor configuration may be configured to filter frequencies above 200 MHz. Additional AC filtering at the transmitter 404 (FIG. 4) and DC line choking may also be used to prevent emissions.

While FIGS. 6, 8, 10, and 12 show full wave bridge rectifiers 620, 820, 1020, and 1220 having diodes $D_1$, $D_2$, $D_3$, and $D_4$, other types of rectifier circuits may be used. For example synchronous or semi-synchronous rectifier circuits may be used that may use switches with gate drives in place of diodes.

Figure 15:
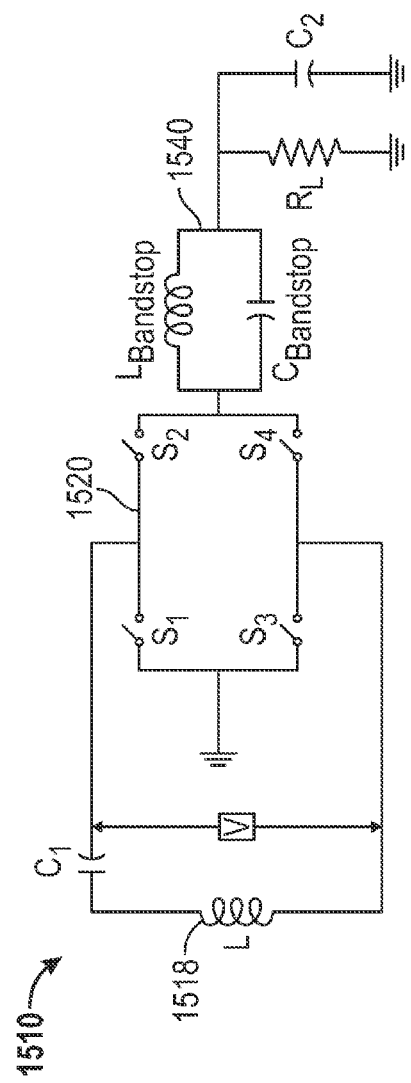
FIG. 15 is another schematic diagram of an exemplary portion of receive circuitry using an exemplary synchronous rectifier circuit configuration with a single band-stop filter circuit, in accordance with an exemplary embodiment of the invention.

FIG. 15 is another schematic diagram of an exemplary portion of receive circuitry 1510 using an exemplary synchronous rectifier circuit configuration with a single band-stop filter circuit 1540, in accordance with an exemplary embodiment of the invention. The receive circuitry 1510 includes similar components to those shown in FIG. 8 in addition to including a synchronous rectifier circuit 1520 in place of the diode bridge rectifier circuit 820 of FIG. 8. The synchronous rectifier circuit 1520 includes switches $S_1$, $S_2$, $S_3$, and $S_4$ that may be controlled via gate drive signals that may be controlled/driven by a processor 516 (FIG. 5). Using switches $S_1$, $S_2$, $S_3$, and $S_4$ may provide greater control over the operation of the rectification. Furthermore, the operation rectifier circuit 1520 may be dynamically adapted to changing power transfer conditions. As shown in FIG. 15, the synchronous rectifier circuit 1520 may be used with the single band-stop filter circuit 1540 configuration as shown in FIG. 8.

Figure 16:
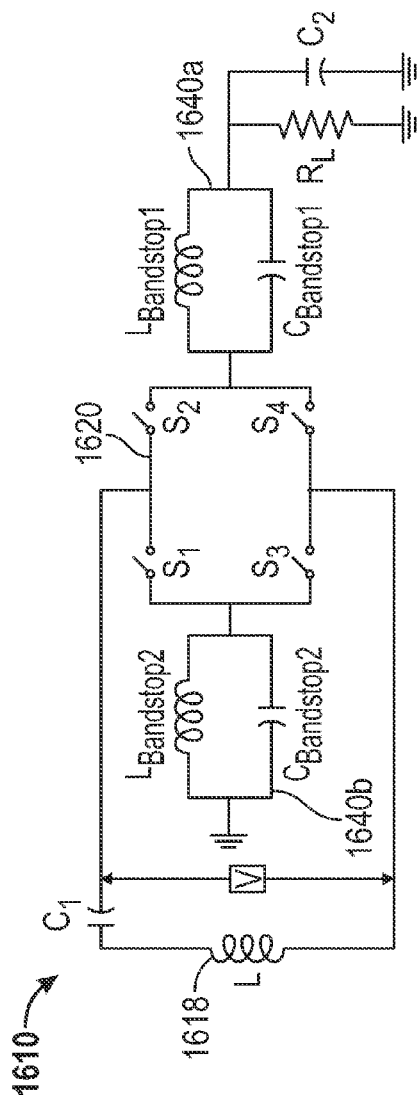
FIG. 16 is another schematic diagram of an exemplary portion of receive circuitry using an exemplary synchronous rectifier circuit configuration with a dual band-stop filter circuit and configuration as shown in FIG. 12, in accordance with an exemplary embodiment of the invention.

FIG. 16 is another schematic diagram of an exemplary portion of receive circuitry 1610 using an exemplary synchronous rectifier circuit 1620 configuration with a balanced dual band-stop filter circuit 1640*a* and 1640*b* configuration as shown in FIG. 12, in accordance with an exemplary embodiment of the invention. As in FIG. 15, the rectifier circuit 1620 of FIG. 16 includes $S_1$, $S_2$, $S_3$, and $S_4$ in place of diodes. The receive circuitry 1610 further includes two band-stop filter circuits 1640*a* and 1640*b* as described above with reference to FIG. 12. In this case, the timing of the waveform for driving the switches $S_1$, $S_2$, $S_3$, and $S_4$ may be carefully synchronized to work with the filter circuit 1640*b* on the "low" side of the rectifier circuit 1620.

Figure 17:
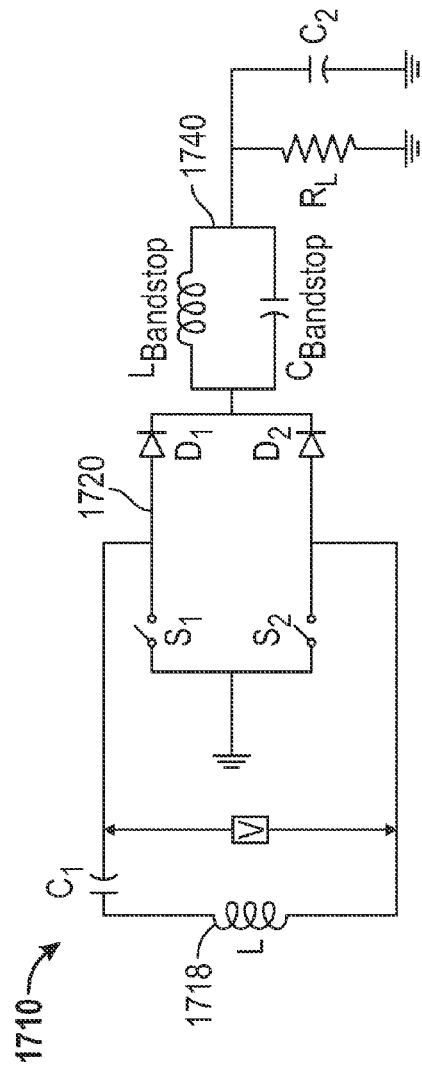
FIG. 17 is another schematic diagram of an exemplary portion of receive circuitry using an exemplary semi-synchronous rectifier circuit configuration with a single band-stop filter circuit, in accordance with an exemplary embodiment of the invention.

FIG. 17 is another schematic diagram of an exemplary portion of receive circuitry 1710 using an exemplary semi-synchronous rectifier circuit 1720 configuration with a single band-stop filter circuit 1740, in accordance with an exemplary embodiment of the invention. In FIG. 17, two of the diodes $D_1$ and $D_3$ of FIG. 8 are replaced with switches $S_1$ and $S_2$ each with gate drives that may be controlled by a processor or controller 516 (FIG. 5). As shown in FIG. 17, the synchronous rectifier circuit 1520 may be used with the single band-stop filter circuit 1740 configuration as shown in FIG. 8.

Figure 18:
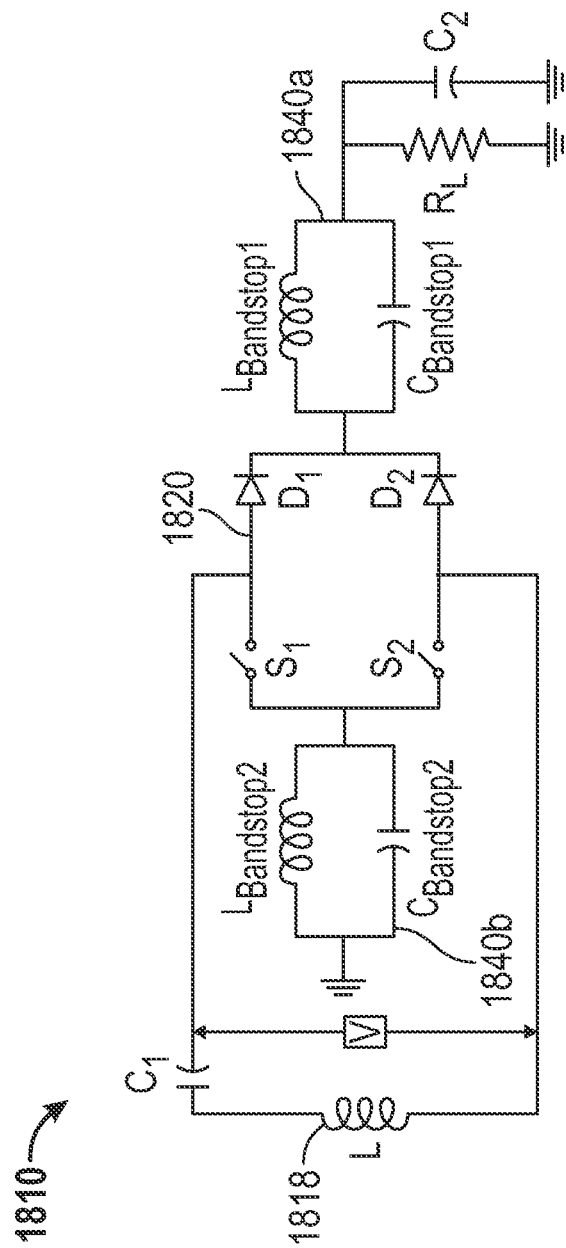
FIG. 18 is another schematic diagram of an exemplary portion of receive circuitry using an exemplary semi-synchronous rectifier circuit configuration with a dual band-stop filter and circuit configuration, in accordance with an exemplary embodiment of the invention.

FIG. 18 is another schematic diagram of an exemplary portion of receive circuitry 1810 using an exemplary semi-synchronous rectifier circuit 1820 configuration with a balanced dual band-stop filter 1840*a* and 1840*b* circuit configuration, in accordance with an exemplary embodiment of the invention. As in FIG. 17, a semi-synchronous rectifier circuit 1820 is provided with two diodes $D_1$ and $D_2$ and two switches $S_1$ and $S_2$. The receive circuitry 1810 includes two band-stop filter circuits 1840*a* and 1840*b* as described above with reference to FIG. 12. In this case, the timing of the signals for driving the switches $S_1$ and $S_2$ may be carefully synchronized to work with the filter circuit 1640*b* on the "low" side of the rectifier circuit 1820 (i.e., connected between the rectifier circuit 1820 and ground). Other rectifier circuit configurations not shown in FIGS. 6, 8, 10, 12 and 14-18 are also envisioned and may be used. The receive circuitry may be adapted to employ any combination of the configurations shown in FIGS. 8, 10, 12, and 14-18. For example, a semi-synchronous rectifier circuit as described above with reference to FIGS. 17 and 18 may be included in place of the rectifier circuit 1420 of FIG. 14 showing the addition of the ferrite beads 1442*a* and 1442*b*.

It should be appreciated that the values for the components in the embodiments described above may vary without having a significant impact on system performance. As such, a wide variety of component values may be chosen for the filter components for various other purposes while still achieving acceptable harmonic reduction.

Table 1 below shows examples values of levels of harmonic content that may rejected when using the various filter circuit configurations as described above for an operating frequency of 6.78 MHz. As shown by Table 1, the operation of the filter circuits (e.g., 840, 1040, 1240*a*, 1240*b*) may result in significant amounts of the harmonic portion of the voltage waveform being filtered and prevent undesirable emissions. It should be appreciated that these values are merely exemplary and are configured to show hypothetical relative amounts of the results of the filter circuits described above. Emissions above 200 MHz may be filtered by the ferrite bead described above. Furthermore, emissions lower than the 7$^{th}$ harmonic may be filtered by transmitter filtering and with a transmitter side DC common mode choke as noted above.

TABLE 1 dB Values Indicate Additional Rejection over a No-Filter Case

| Rejection | Frequency | High Side Band-stop (FIG. 8) | Balanced Duel Band-stop (FIG. 12) | High Side Band-stop w/ Double Inductance (FIG. 10) |
|---|---|---|---|---|
| 3$^{rd}$ Harmonic | 20.34 MHz | 5.08 dB | 2.25 dB | 0.50 dB |
| 5$^{th}$ Harmonic | 33.90 MHz | 7.24 dB | 8.34 dB | 7.14 dB |
| 7$^{th}$ Harmonic | 47.46 MHz | 7.29 dB | 11.22 dB | 10.71 dB |
| 9$^{th}$ Harmonic | 61.02 MHz | 6.63 dB | 12.56 dB | 13.07 dB |
| 10$^{th}$ Harmonic | 183.1 MHz | 3.54 dB | 10.98 dB | 13.63 dB |
| 47$^{th}$ Harmonic | 318.7 MHz | 4.79 dB | 4.68 dB | 11.71 dB |
| 65$^{th}$ Harmonic | 440.7 MHz | 6.37 dB | 8.80 dB | 13.66 dB |

Figure 19:
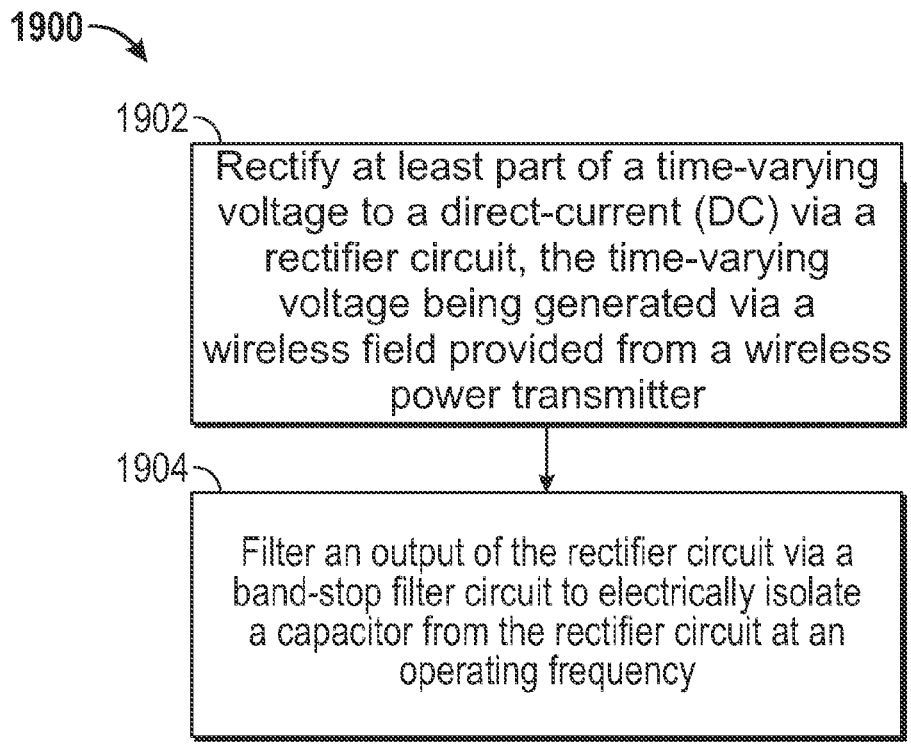
FIG. 19 is a flowchart of an exemplary method for filtering at a wireless power receiver, in accordance with an exemplary embodiment of the invention.

FIG. 19 is a flowchart of an exemplary method 1900 for filtering at a wireless power receiver, in accordance with an exemplary embodiment of the invention. In block 1902, a rectifier circuit 820 may rectify at least part of a time-varying voltage to a direct-current (DC). The time-varying voltage is generated via a wireless field provided from a wireless power transmitter 404 (FIG. 4). In block 1904, a band-stop filter circuit 840 may filter an output of the rectifier circuit 820 to electrically isolate a capacitor C$_2$ from the rectifier circuit 820 at an operating frequency. In some embodiments, the method 1900 may include filtering the output of the rectifier circuit 820 via a second band-stop filter 1240b (FIG. 12) to electrically isolate a ground connection from the rectifier circuit 820 at the operating frequency. Filtering may include filtering to increase an impedance between the rectifier circuit 820 and the capacitor C$_2$ at the operating frequency. The method 1900 may further include generating the time-varying voltage via a receive coil 818 electrically connected to the rectifier circuit 820. Filtering may include filtering to reduce wireless emissions radiating from the receive coil 818. The receive coil 818 may be configured to substantially resonate at the operating frequency. The method may further include filtering via a ferrite bead 1442a and a capacitor circuit C$_3$ to substantially allow frequency components of the time-varying voltage falling below a threshold frequency (e.g., 200 MHz). The rectifier circuit 820 may include at least one of a full wave rectifier circuit including one or more diodes and a synchronous rectifier circuit including one or more switches. The synchronous rectifier may include one or more diodes. The operating frequency may be substantially 6.78 MHz. Different values for components may be used for the filter circuit 840 depending on the operating frequency and other variables.

Figure 20:
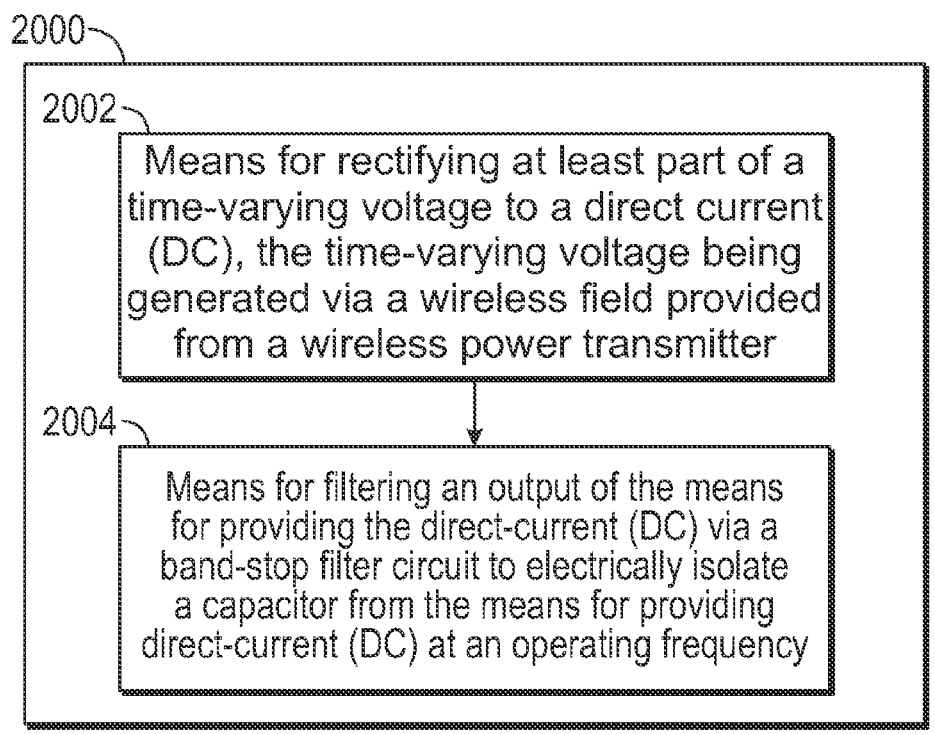
FIG. 20 is a functional block diagram of a wireless power receiver, in accordance with an exemplary embodiment of the invention.

FIG. 20 is a functional block diagram of a wireless power receiver 2000, in accordance with an exemplary embodiment of the invention. Wireless power receiver 2000 comprises means 2002 and 2004 for the various actions discussed with respect to FIGS. 1-19.

It should be appreciated that the embodiments described herein may additionally relate to non-resonant wireless power transfer systems where a receive or transmit coil may or may not be configured to resonate. It should be further appreciated that the embodiments described herein may be applicable to a variety of time-varying voltage (AC) input sources. For example, the receive coil 1218 and capacitor C$_1$ may be replaced with a variety of different AC input sources and used in different systems. It should be further appreciated that the operating frequency may vary according to the particular application. For example, as noted above, the operating frequency may be one of substantially 468.75 KHz, 6.78 MHz and 13.56 MHz. It should further be appreciated that while similar components in different figures may be denoted by different reference numbers, the components may be different, similar, or the same as components of other figures. For example, the rectifier circuit 820 of FIG. 8 may be the same as the rectifier circuit 1220 of FIG. 12.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, with reference to FIG. 12, means for rectifying may include a rectifier circuit 820 that may be a full wave rectifier. The means for rectifying may include a diode bridge rectifier circuit, a synchronous rectifier circuit, a semi-synchronous rectifier circuit, or any combination thereof as described above. As another example, the means for filtering may include a filter circuit 840 such as a band-stop filter circuit 840. Means for wirelessly receiving power may include a receive coil 818 or a receive coil 818 in combination with a capacitor to form a resonant circuit. Means for wirelessly transmitting power may include a transmit coil and/or the transmit circuitry 410 (FIG. 4) as described above.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver comprising:
   a receive coil configured to generate an alternating current (AC) generated via a wireless field provided from a wireless power transmitter, the alternating current (AC) having an operating frequency;
   a full wave rectifier circuit configured to provide direct-current (DC) based at least in part on the alternating current (AC);
   a first band-stop filter circuit configured to be tuned to the operating frequency to reduce wireless emissions radiating from the receive coil, filter an output of the full wave rectifier circuit and electrically isolate a capacitor from the full wave rectifier circuit at the operating frequency; and
   a second band-stop filter circuit configured to electrically isolate a ground connection from the full wave rectifier circuit at the operating frequency.

2. The receiver of claim 1, wherein one or both of the first and second band-stop filter circuit is further configured to increase an amount of impedance between the full wave rectifier circuit and the capacitor at the operating frequency.

3. The receiver of claim 1, wherein the receive coil is configured to substantially resonate at the operating frequency.

4. The receiver of claim 3, wherein at least a portion of the wireless emissions radiating from the receive coil correspond to at least one harmonic of the operating frequency.

5. The receiver of claim 1, wherein one or both of the first and second band-stop filter circuit comprises at least one inductor and at least one capacitor.

6. The receiver of claim 5, wherein the at least one inductor is electrically connected in parallel to the at least one capacitor.

7. The receiver of claim 1, further comprising a ferrite bead and a capacitor circuit configured to substantially allow frequency components of the alternating current (AC) falling below a threshold frequency.

8. The receiver of claim 1, wherein the operating frequency is substantially 6.78 MHz.

9. The receiver of claim 1, wherein the full wave rectifier circuit comprises at least one of:
   one or more diodes; and
   a synchronous rectifier circuit comprising one or more switches.

10. The receiver of claim 9, wherein the synchronous rectifier circuit comprises one or more diodes.

11. A method for filtering at a wireless power receiver, the method comprising:
    generating, via a receive coil, an alternating current (AC) generated via a wireless field provided from a wireless power transmitter, the alternating current (AC) having an operating frequency;
    rectifying the alternating current (AC) to a direct-current (DC) via a full wave rectifier circuit electrically connected to the receive coil;
    filtering an output of the full wave rectifier circuit via a first band-stop filter circuit tuned substantially to the operating frequency to reduce wireless emissions radiating from the receive coil and to electrically isolate a capacitor from the full wave rectifier circuit at the operating frequency; and
    filtering the output of the full wave rectifier circuit via a second band-stop filter circuit to electrically isolate a ground connection from the full wave rectifier circuit at the operating frequency.

12. The method of claim 11, wherein filtering comprises filtering to increase an impedance between the full wave rectifier circuit and the capacitor at the operating frequency.

13. The method of claim 11, wherein the receive coil is configured to substantially resonate at the operating frequency.

14. The method of claim 13, wherein at least a portion of the wireless emissions radiating from the receive coil correspond to at least one harmonic of the operating frequency.

15. The method of claim 11, wherein one or both of the first and second band-stop filter comprises at least one inductor and at least one capacitor.

16. The method of claim 15, wherein the at least one inductor is electrically connected in parallel to the at least one capacitor.

17. The method of claim 11, further comprising filtering via a ferrite bead and a capacitor circuit configured to substantially allow frequency components of the-alternating current (AC) falling below a threshold frequency.

18. The method of claim 11, wherein the operating frequency is substantially 6.78 MHz.

19. The method of claim 11, wherein the full wave rectifier circuit comprises at least one of:

one or more diodes; and a synchronous rectifier circuit comprising one or more switches.

20. The method of claim 11, wherein the synchronous rectifier circuit comprises one or more diodes.

21. A wireless power receiver comprising:

means for generating an alternating current (AC) generated via a wireless field provided from a wireless power transmitter, the alternating current (AC) having an operating frequency;

means for full wave rectifying at least part of the alternating current (AC) to a direct-current (DC);

first means for filtering an output of the means for rectifying tuned substantially to the operating frequency to reduce wireless emissions radiating from the means for generating the alternating current (AC) and to electrically isolate a capacitor from the means for rectifying at the operating frequency; and second means for filtering configured to electrically isolate a ground connection from the means for rectifying at the operating frequency.

22. The receiver of claim 21, wherein one or both of the first and second means for filtering is configured to increase an amount of impedance between the means for rectifying and the capacitor at the operating frequency.

23. The receiver of claim 21, wherein one or both of the first and second means for generating the alternating current (AC) is configured to substantially resonate at the operating frequency.

24. The receiver of claim 23, wherein at least a portion of the wireless emissions radiating from the means for generating the alternating current (AC) correspond to at least one harmonic of the operating frequency.

25. The receiver of claim 21, wherein one or both of the first and second means for filtering comprises at least one inductor and at least one capacitor.

26. The receiver of claim 25, wherein the at least one inductor is electrically connected in parallel to the at least one capacitor.

27. The receiver of claim 21, further comprising a ferrite bead and a capacitor circuit configured to substantially allow frequency components of the alternating current (AC) falling below a threshold frequency.

28. The receiver of claim 21, wherein the operating frequency is substantially 6.78 MHz.

29. The receiver of claim 21, wherein the means for full wave rectifying comprises a full wave rectifier circuit.

30. The receiver of claim 29, wherein the full wave rectifier circuit comprises at least one of:

one or more diodes; and a synchronous rectifier circuit comprising one or more switches.

31. The receiver of claim 30, wherein the synchronous rectifier circuit comprises one or more diodes.

32. The receiver of claim 21, wherein one or both of the first and second means for filtering comprises a filter circuit.

33. The receiver of claim 1, wherein one or both of the first and second band-stop filter circuit is configured to reduce wireless emissions radiating from the receive coil at a harmonic of the operating frequency when one or both of the first and second band-stop filter circuit is tuned substantially to the operating frequency.

34. The method of claim 11, wherein one or both of the first and second band-stop filter circuit is configured to reduce wireless emissions radiating from the receive coil at a harmonic of the operating frequency when one or both of the first and second band-stop filter is circuit tuned substantially to the operating frequency.

35. The receiver of claim 21, wherein one or both of the first and second means for filtering is configured to reduce wireless emissions at a harmonic of the operating frequency when one or both of the first and second means for filtering is tuned substantially to the operating frequency.

* * * * *